United States Patent [19]
Rylatt

[11] 4,001,079
[45] Jan. 4, 1977

[54] THERMAL BAFFLE FOR FAST-BREEDER REACTON
[75] Inventor: John A. Rylatt, Monroeville, Pa.
[73] Assignee: The United States of America as represented by the United States Energy Research and Development Administration, Washington, D.C.
[22] Filed: Aug. 15, 1975
[21] Appl. No.: 605,371
[52] U.S. Cl. .................................. 176/87; 176/40; 176/61; 176/64
[51] Int. Cl.² ........................................ G21C 3/22
[58] Field of Search ............... 176/40, 50, 61, 64, 176/65, 87; 52/393, 615

[56] References Cited
UNITED STATES PATENTS

| | | | |
|---|---|---|---|
| 2,990,349 | 6/1961 | Roman | 176/61 X |
| 3,192,120 | 6/1965 | Campbell | 176/61 X |
| 3,211,621 | 10/1965 | Creagan | 176/61 X |
| 3,847,733 | 11/1974 | Ventre | 176/65 X |
| 3,878,870 | 4/1975 | Atherton et al. | 176/61 X |
| 3,936,350 | 2/1976 | Borst | 176/87 |

OTHER PUBLICATIONS

Fast Reactor Technology (Yevick–Editor),– Plant Design, MIT Press, 1966, pp. 103–109.

Primary Examiner—Peter A. Nelson
Attorney, Agent, or Firm—Dean F. Carlson; Arthur A. Churm; Frank H. Jackson

[57] ABSTRACT

A liquid-metal-cooled fast-breeder reactor includes a bridge structure for separating hot outlet coolant from relatively cool inlet coolant consisting of an annular stainless steel baffle plate extending between the core barrel surrounding the core and the thermal liner associated with the reactor vessel and resting on ledges thereon, there being inner and outer circumferential webs on the lower surface of the baffle plate and radial webs extending between the circumferential webs, a stainless steel insulating plate completely covering the upper surface of the baffle plate and flex seals between the baffle plate and the ledges on which the baffle plate rests to prevent coolant from washing through the gaps therebetween. The baffle plate is keyed to the core barrel for movement therewith and floating with respect to the thermal liner and reactor vessel.

3 Claims, 2 Drawing Figures

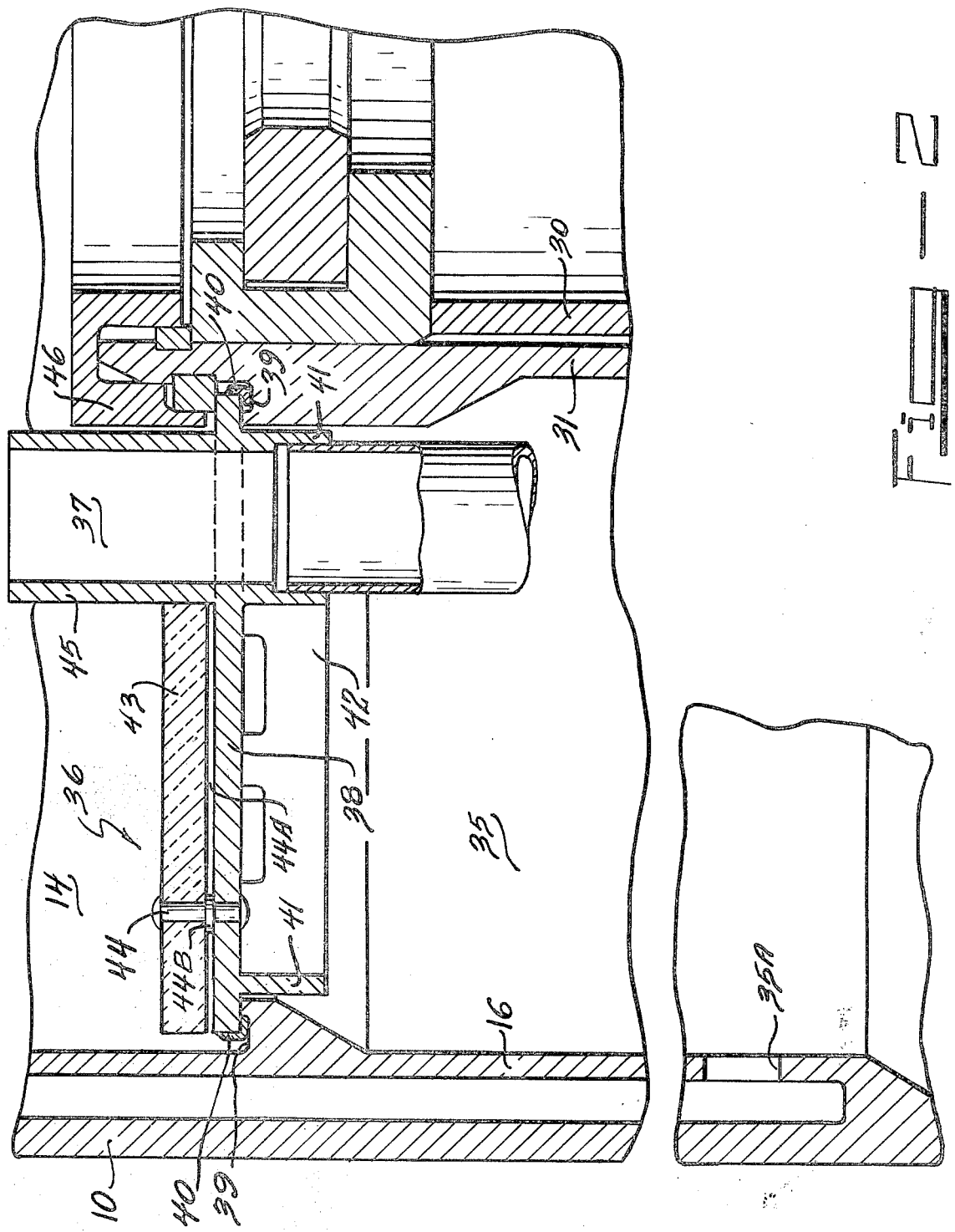

THERMAL BAFFLE FOR FAST-BREEDER REACTON

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the art of nuclear reactors and in particular to a bridge structure serving as a thermal and hydraulic barrier between heated outlet sodium and relatively cool sodium which has not flowed through the core. A nuclear reactor includes a pressure vessel into which a heat-transfer fluid, typically liquid sodium for fast-breeder reactors, is pumped under pressure. The sodium flows through the core and is heated; the hot sodium emerges from the vessel and flows to electrical power generating equipment. Typically sodium is introduced into the lower portion of the pressure vessel and flows upwardly through the core into the upper portion of the pressure vessel. Thus a thermal and hydraulic barrier is required in the pressure vessel between the core and the pressure vessel, separating the cool inlet sodium from the hot outlet sodium. Functionally, this barrier separates the annulus between the core and the pressure vessel — containing low-pressure, low-temperature sodium — from the upper sodium outlet plenum — containing high-temperature, high-pressure sodium — and provides elastic seals at inner and outer circumference. In addition, for a large fast-breeder reactor, it must provide guidance for the upper end of fuel and transfer storage chambers and provide the insulation required to minimize the heat flux from the hot outlet plenum sodium to the fuel storage annulus sodium.

In the Fast Flux Test Facility — now under construction in the State of Washington — Inconel is employed as the material of construction for this barrier and the barrier is not sealed to the pressure vessel at its outer edge. Flow experiments for the Fast Flux Facility indicate that flow instabilities and variable pressure distribution exist in the sodium pool immediately above the barrier. These conditions induce alternate coolant flow from the outlet plenum and from the cooler sodium below the barrier across the edge of the horizontal baffle forming this barrier. Inconel was selected as being the least expensive material which is capable of existing in this environment for the life of the reactor. In order to employ austenitic stainless steel, washing across the edges of the baffle by coolant of substantially different temperatures must be minimized. Due to the size of the baffle and the thermal stresses involved, this cannot be accomplished simply by adding a seal to the outer circumference of the barrier.

SUMMARY OF THE INVENTION

According to the present invention, a bridge structure for separating hot outlet coolant from cool inlet coolant in a liquid-metal-cooled fast-breeder reactor includes an annular austenitic stainless steel baffle plate extending between the core barrel and the thermal liner of the reactor and resting on ledges thereon, there being inner and outer circumferential webs on the lower surface of the baffle plate and radial webs extending between the circumferential webs, insulation on the upper surface of the baffle plate consisting of an austenitic stainless steel plate thereon and completely covering the upper surface and flex seals between the edge of the baffle plate and the ledges on which the baffle plate rests, the baffle plate being keyed to the core barrel to move therewith and floating with respect to the thermal liner.

BRIEF DESCRIPTION OF THE DRAWINGS

FIG. 1 is a view partially in longitudinal section and partly in elevation with the vessel open of a nuclear reactor incorporating the present invention and FIG. 2 is a fragmented vertical section taken through the bridge structure of the present invention.

DESCRIPTION OF THE INVENTION

Figure 1:
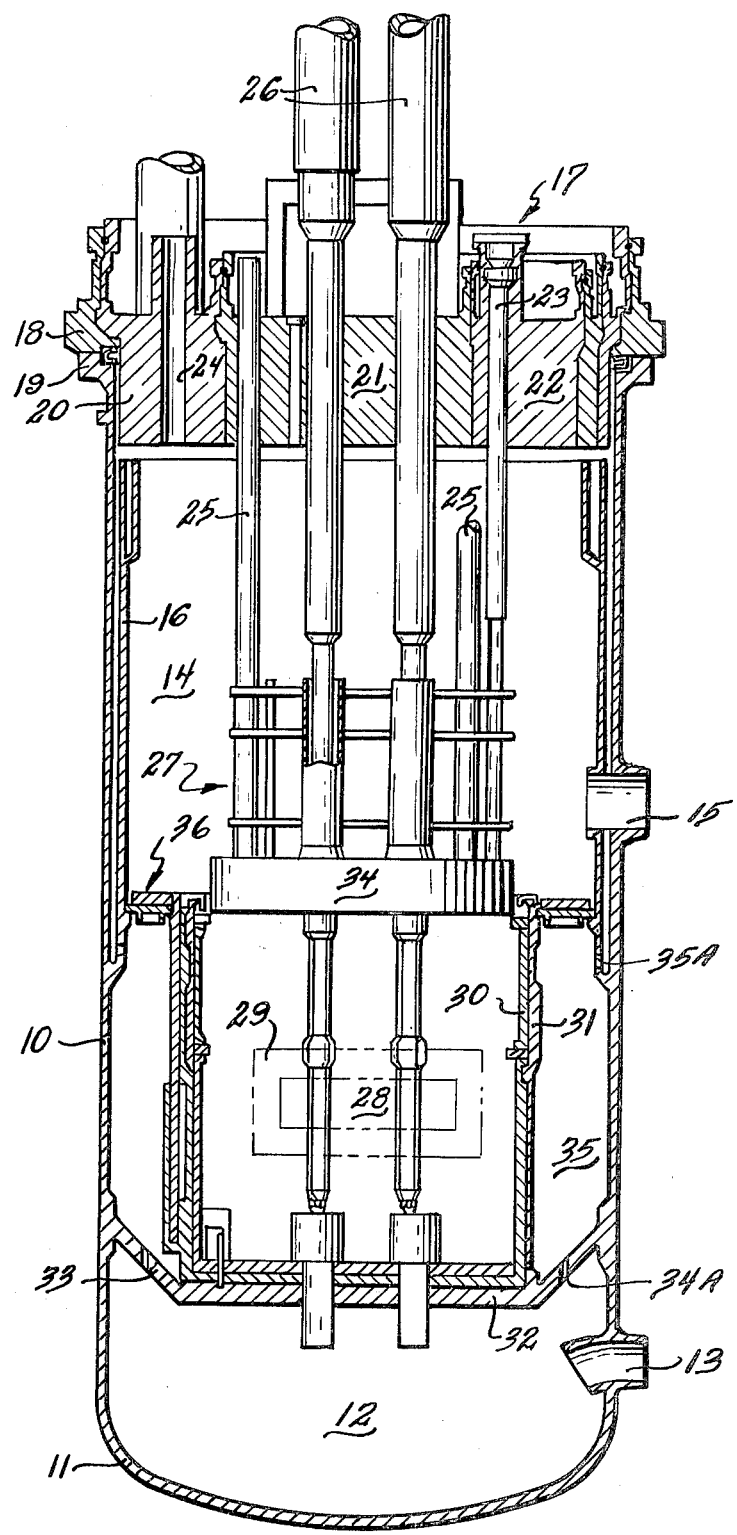

A reactor incorporating the present invention is shown in FIG. 1 but only so much of this reactor will be described herein as is necessary to understand the setting of the present invention. Further details thereof are given in patent application S.N. 503,149, filed Sept. 4, 1974.

The reactor shown includes a generally cylindrical pressure vessel 10 closed at the bottom by a bell 11 which bounds an inlet plenum 12. The vessel 10 has a plurality of inlet nozzles 13 above the bell 11 through which a heat-exchange fluid such as liquid sodium is supplied to the plenum 12 under pressure. The vessel 10 has an outlet plenum 14 in the upper portion thereof from which the hot coolant is derived through a plurality of outlet nozzles 15. The vessel is provided with a thermal liner 16 encircling the outlet plenum 14 and the regions immediately above and below the outlet plenum.

At the top the vessel 10 is closed by a head 17. The head has a stationary outer ring 18 which is bolted to a flange 19 of the vessel 11. The head 17 has a plurality of rotating plugs 20, 21 and 22 which position the fuel and control handling equipment over all core assembly locations. Plug 22 supports an in-vessel transfer machine port 23 eccentrically; plug 20 supports an ex-vessel transfer machine port 24 eccentrically; and plug 21 supports columns 25 which support control rod drive mechanisms 26 as well as the upper internal structure 27 of the reactor.

Within the vessel 10 there is a core 28 surrounded by a blanket 29. Details of core and blanket assemblies and of control rods are not given here, since they form no part of the present invention. Core 28 and blanket 29 are surrounded by a fixed shield 30 and a core barrel 31. The core is supported by plate 32 which is attached to vessel 10 by conical skirt 33. Above the core a shroud 34 surrounds the lower portion of the upper internal structure 27 which collects and distributes coolant flowing out of the core and blanket assemblies. Bypass coolant flows through orifices 34A (shown schematically) to annulus 35 between core barrel 31 and pressure vessel 10 and out through ports 35A in thermal liner 16 to the outlet nozzles 15. Extending between the top of core barrel 31 and thermal liner 16 is a bridge structure 36 which separates the hot sodium in outlet plenum 14 from the relatively cool sodium in bypass coolant annulus 35. Bypass coolant cools removable radial shielding (not shown), fixed radial shielding 30, core barrel 31, pressure vessel 10, thermal liner 16, utility wells 37 (shown sketchily in FIG. 2) and bridge structure 36.

As shown in FIG. 2, the barrier between the hot sodium in outlet plenum 14 and the relatively cool sodium in bypass coolant annulus 35 is bridge structure 36 which includes an annular austenitic stainless steel baffle plate 38 supported from thermal liner 16 and core barrel 31 by ledges 39. State-of-the-art flex seals 40 are provided between the edges of baffle plate 38 and ledges 39 at the inner and outer periphery of the annular plate. Baffle plate 38 is provided with circumferential webs 41 near the outer and inner periphery thereof and radial webs 42 at 10° intervals extending between the circumferential webs. Webs 41 and 42 are employed to strengthen the baffle plate. The openings shown in radial webs 42 are optional, depending on the method of fabrication. A thick segmented austenitic stainless steel insulating plate 43 is attached to the top surface of baffle plate 38 by tie-down pins 44. Plates 43 are coextensive in size with baffle plate 38 to insulate the baffle plate from the hot sodium thereabove.

It will be understood that temperature differences of 275° F. can occur between the core effluent and the bypass coolant. Since temperatures in the fuel storage annulus 35 must be maintained close to the inlet sodium temperature in order (a) to ensure that stored fuel can be adequately cooled, and (b) to ensure that the highly loaded heavy load bearing structures do not operate with large steady-state temperature gradients and since cooling of the fuel storage annulus is by a relatively low bypass flow, it is necessary that the heat flux to the fuel storage annulus be kept low, for which reason bridge structure 36 must be well insulated.

Utility wells 37 are defined by sleeves 45 forming an integral part of baffle plate 38. Baffle plate 38 is keyed to the core barrel 31 by keys 46 to move with the core barrel under earthquake motion. Plate 38 floats with respect to thermal liner 16.

Specific details of a bridge structure proposed for use in one particular sodium-cooled fast-breeder reactor will next be given. For this reactor, baffle plate 38 is 32.3 feet O.D. and 25.4 feet I.D. and is formed of 1 ½-inch-thick type 304 stainless steel plate. Plate 38 is fabricated in several sections which would be individually installed in the reactor vessel 10 and joined by seal welds. Insulating plates 43 are 3 inches thick and are constructed as 36° to 45° segments of the annulus, each segment being attached to baffle plate 38 by three or four tie-down pins 44 which allow sufficient motion relative to the baffle plate for the free thermal bow of each separate segment. This is accomplished by employing collars 44A on pins 44 to separate insulating plate 43 from baffle plate 38 by a ½-inch-thick (nominal) gap 44B. Sodium in the gap conducts heat from plate 43 to plate 38 but, being essentially stagnant, does not overheat plate 38. It will be noted that insulating plate 43 is twice as thick as baffle plate 38. Therefore the thermal gradient through insulating plates 43 is twice that through baffle plate 38. For a total temperature difference of 275° between core effluent and bypass coolant, approximately 180° would occur in the insulation — necessitating provision for thermal bow — and 90° would be in the baffle plate which can be tolerated without provision for thermal bow.

Insulating plate 43 ensures geometric stability at the seal interfaces, minimizes temperature differences across baffle plate 38, thus reducing the tendency of this plate to bow and, with seals 40, prevents pulsating flow from the outlet plenum from contacting baffle plate 38. The isothermal bridge structure thus produced permits the use of flex seals 40 at both the inner circumference and outer circumference of the baffle plate 38. These seals are state-of-the-art seals and are attached separately to the baffle plate prior to positioning the baffle plate in the pressure vessel. Five wells 37 — possibly having Inconel liners — are required for fuel transfer, temporary storage of fuel and to accommodate surveillance specimens. These wells are supported by the core barrel and horizontal baffle plate. Any relative motion occurs between the bridge structure and the thermal liner and the stiffer core barrel is employed as a stable support for the bridge structure.

The embodiments of the invention in which an exclusive property or privilege is claimed are defined as follows:

1. In a sodium-cooled fast-breeder reactor comprising a core disposed within a generally cylindrical pressure vessel, a thermal liner having a ledge thereon immediately interior of the upper portion of the pressure vessel, a cylindrical vertically disposed core barrel having a ledge thereon disposed surrounding the core within the pressure vessel, an inlet plenum disposed in the lower portion of the pressure vessel below the core, a plurality of inlet nozzles communicating with said inlet plenum, an outlet plenum in the upper portion of the pressure vessel above the core, a plurality of outlet nozzles communicating with said outlet plenum, a conical skirt connecting the lower end of the core barrel with the pressure vessel, means for bypassing a relatively low volume of coolant past the core and through the annulus between the core barrel and the pressure vessel to the outlet nozzles, and a horizontal thermal baffle extending between the top of the core barrel and resting on the ledge thereon and the thermal liner and resting on the ledge thereon to separate the hot coolant in the outlet plenum from the relatively cool coolant in the bypass coolant annulus, the improvement wherein said thermal baffle comprises a bridge structure consisting of an austenitic stainless steel baffle plate, a segmented austenitic stainless steel insulating plate covering the upper surface of said baffle plate, tie-down pins spacing the segments of the insulating plate from the baffle plate and fastening them thereto to allow sufficient motion of the segments of the insulating plate relative to the baffle plate for the free thermal bow of each separate segment, flex seals extending between the edge of the baffle plate and the ledges on the core barrel and thermal liner to prevent sodium of different temperatures from washing therethrough, said thermal baffle being keyed to the core barrel to move therewith and being floating with respect to the thermal liner and pressure vessel.

2. The improvement of claim 1 wherein said insulating plate is twice the thickness of the baffle plate.

3. The improvement of claim 2 including inner and outer circumferential webs on the lower surface of the baffle plate and radial webs extending between said inner and outer circumferential webs.

* * * * *